US012111042B2

(12) United States Patent
Leung et al.

(10) Patent No.: US 12,111,042 B2
(45) **Date of Patent: *Oct. 8, 2024**

(54) VARIABLE MULTI-COLOR LED LIGHT STRING AND CONTROLLER FOR AN ARTIFICIAL TREE

(71) Applicant: POLYGROUP MACAU LIMITED (BVI), Tortola (VG)

(72) Inventors: Chi Yin Alan Leung, Apleichau (HK); Chi Kin Samuel Kwok, Shenzhen (CN)

(73) Assignee: POLYGROUP MACAU LIMITED (BVI), Road Town (VG)

( * ) Notice: Subject to any disclaimer, the term of this patent is extended or adjusted under 35 U.S.C. 154(b) by 82 days.

This patent is subject to a terminal disclaimer.

(21) Appl. No.: 17/959,112

(22) Filed: Oct. 3, 2022

(65) Prior Publication Data

US 2023/0022936 A1 Jan. 26, 2023

Related U.S. Application Data

(63) Continuation of application No. 17/329,736, filed on May 25, 2021, now Pat. No. 11,460,179, which is a (Continued)

(51) Int. Cl.
*F21V 23/00* (2015.01)
*F21S 4/10* (2016.01)
(Continued)

(52) U.S. Cl.
CPC .............. *F21V 23/003* (2013.01); *F21S 4/10* (2016.01); *F21V 23/00* (2013.01); *F21V 23/001* (2013.01);
(Continued)

(58) Field of Classification Search
CPC ........ F21V 23/00; F21V 23/003; F21V 23/02; F21S 4/10; F21S 10/02; F21S 10/023;
(Continued)

(56) References Cited

U.S. PATENT DOCUMENTS 4,215,277 A 7/1980 Weiner et al.
5,747,940 A 5/1998 Openiano
(Continued)

FOREIGN PATENT DOCUMENTS

CN 202327778 U 7/2012
CN 202629754 U 12/2012
CN 105114850 A 12/2015

*Primary Examiner* — Jason M Crawford
(74) *Attorney, Agent, or Firm* — GREENBERG TRAURIG LLP; Trenton A. Ward

(57) ABSTRACT

Certain embodiments of the disclosed technology include a decorative lighting system that can be integrated with an artificial tree. The decorative lighting system may include a white light emitting diode (LED) light string and a variable-color LED light string. The variable-color LED light string may employ LED lamps having embedded Red, Green, and Blue (RGB) LEDs. The RGB LED lamps may include an embedded integrated circuit (IC) configured to communicate with and control the energizing of each of the corresponding RGB LEDs to create a multitude of colors and color combinations that can vary with time to create a light show. An electronic controller in communication with the LED lamps may allow a user to select the mode for the light show and further may provide a periodic reset signal to restart or re-synchronize the light show.

18 Claims, 6 Drawing Sheets

Related U.S. Application Data continuation of application No. 16/940,985, filed on Jul. 28, 2020, now Pat. No. 11,019,692, which is a continuation of application No. 16/559,007, filed on Sep. 3, 2019, now Pat. No. 10,728,978, which is a continuation of application No. 15/901,037, filed on Feb. 21, 2018, now Pat. No. 10,440,795, which is a continuation of application No. 15/448,223, filed on Mar. 2, 2017, now Pat. No. 9,907,136.

(60) Provisional application No. 62/303,603, filed on Mar. 4, 2016.

(51) Int. Cl.

| | |
|---|---|
| ***F21V 23/02*** | (2006.01) |
| ***F21W 121/04*** | (2006.01) |
| ***H05B 45/10*** | (2020.01) |
| ***H05B 45/20*** | (2020.01) |
| ***H05B 45/40*** | (2020.01) |
| ***H05B 47/155*** | (2020.01) |
| *F21Y 103/10* | (2016.01) |
| *F21Y 113/17* | (2016.01) |
| *F21Y 115/10* | (2016.01) |

(52) U.S. Cl.
CPC ............. *F21V 23/02* (2013.01); *H05B 45/10* (2020.01); *H05B 45/20* (2020.01); *H05B 45/40* (2020.01); *H05B 47/155* (2020.01); *F21W 2121/04* (2013.01); *F21Y 2103/10* (2016.08); *F21Y 2113/17* (2016.08); *F21Y 2115/10* (2016.08)

(58) Field of Classification Search
CPC ............. F21W 2121/04; F21Y 2113/17; F21Y 2115/10; H05B 45/10; H05B 45/20; H05B 45/40
See application file for complete search history.

(56) References Cited

U.S. PATENT DOCUMENTS

| | | | | |
|---|---|---|---|---|
| 7,131,748 | B2 * | 11/2006 | Kazar | H05B 47/155 315/184 |
| 9,883,566 | B1 * | 1/2018 | Chen | F21V 23/001 |
| 9,907,136 | B2 * | 2/2018 | Leung | H05B 45/20 |
| 10,440,795 | B2 * | 10/2019 | Leung | H05B 45/10 |
| 10,728,978 | B2 * | 7/2020 | Leung | F21S 4/10 |
| 11,019,692 | B2 * | 5/2021 | Leung | H05B 47/155 |
| 11,460,179 | B2 * | 10/2022 | Leung | F21V 23/001 |
| 2007/0230174 | A1 * | 10/2007 | Hicks | F21S 13/14 362/249.16 |
| 2009/0218952 | A1 | 9/2009 | Tang | |
| 2013/0120971 | A1 * | 5/2013 | Chen | F21V 23/06 362/123 |
| 2015/0359066 | A1 * | 12/2015 | Loomis | H05B 45/20 362/123 |
| 2020/0245427 | A1 * | 7/2020 | Lin | H05B 47/155 |
| 2021/0007527 | A1 * | 1/2021 | Loomis | A41G 1/005 |
| 2023/0022936 | A1 * | 1/2023 | Leung | H05B 47/155 |

* cited by examiner

VARIABLE MULTI-COLOR LED LIGHT STRING AND CONTROLLER FOR AN ARTIFICIAL TREE

CROSS-REFERENCE TO RELATED APPLICATIONS

This application claims the benefit, under 35 U.S.C. § 120, of U.S. patent application Ser. No. 17/329,736, filed May 25, 2021, which is a continuation of U.S. patent application Ser. No. 16/940,985, filed Jul. 28, 2020, which is a continuation of U.S. patent application Ser. No. 16/559,007, filed Sep. 3, 2019, which is a continuation of U.S. patent application Ser. No. 15/901,037, filed Feb. 21, 2018, which is a continuation of U.S. patent application Ser. No. 15/448,223, filed Mar. 2, 2017, which claims the benefit under 35 U.S.C. § 119(e) of U.S. Provisional Patent Application No. 62/303,603, filed Mar. 4, 2016, the entire contents and substance of which are hereby incorporated by reference as if fully set forth below.

TECHNICAL FIELD

The disclosed technology relates generally to a light emitting diode (LED) light string for an artificial Christmas tree, and in particular, to a LED light string and associated controllers that can produce illumination having colors that vary with time.

BACKGROUND

As part of the celebration of the Christmas season, it is a tradition to bring a pine or evergreen tree into the home and decorate it with ornaments, lights, garland, tinsel, and the like. Natural trees, however, can be quite expensive and are recognized by some as a waste of environmental resources. In addition, natural trees can be messy, leaving both sap and needles behind after removal. Natural trees are typically watered to prevent drying and to minimize the fire hazard associated with dry needles and branches. Each year a natural tree is purchased and decorated and, at the end of the Christmas season, the lights and decorations are removed. At the end of the season, natural trees often are disposed in landfills, further stressing these environments.

To overcome the disadvantages of a natural Christmas tree, yet still incorporate a tree into the holiday celebration, a great variety of artificial Christmas trees are available. For the most part, these artificial trees are assembled for use, decorated, and disassembled after use. Artificial Christmas trees have the advantage of being useable over a period of years and thereby eliminate the annual expense of purchasing live trees for the short holiday season. Further, they help reduce the chopping down of trees for a temporary decoration, and the subsequent disposal, typically in a landfill, of same.

In many natural and artificial trees, a light string may be manually attached to the tree and rearranged to achieve a bulb spacing that is pleasing to the eye. Often each light string will include a certain color of bulb, or a mixture of bulb colors. To provide interesting and pleasing illumination variations, switching power distribution controllers, bulbs with internal blinkers, optical fiber lighting systems, and other lighting options have been designed and are available to provide a changing illumination pattern. A difficulty encountered with developing pleasing illumination patterns however involves changing the color of the pattern. Typically the colors are limited by the specific color LEDs used in the bulb.

BRIEF SUMMARY

Briefly described, certain embodiments of the disclosed technology may include decorative lighting systems integrated with artificial trees. In one example implementation, the decorative lighting system may include one or more white light emitting diode (LED) light strings and one or more variable-color LED light strings. Certain example implementations may include just the variable-color LED light strings.

According to an example implementation, the variable-color LED light string of the disclosed decorative lighting system may employ LED lamps (or bulbs) having a plurality of embedded LEDs. In one example implementation, the plurality of embedded LEDs can include Red, Green and Blue (RGB) LEDs. In an example implementation, the LED lamps include an embedded integrated circuit (IC) inside each RGB LED lamp. The embedded IC can be configured to communicate with and control the energizing of each of the corresponding RGB LEDs to create a multitude of different colors and color combinations. According to an example implementation of the disclosed technology, once the variable-color LED light strings are powered, the embedded ICs within each RGB LED are configured to initiate and control a sequence of illuminating colors that can vary with time.

According to an example implementation of the disclosed technology, the one or more decorative light strings (such as a white-light LED light string and/or variable-color LED light string) are further in communication with an electronic controller. In certain example implementations, the electronic controller may allow a user to select for display any combination of the (1) RGB LED illumination sequence; (2) the white LED illumination; and/or (3) both the white LED illumination and the RGB LED illumination sequence.

According to certain example implementations of the disclosed technology, the timing of the variable-colors associated with the RGB LED illumination sequence may be controlled by a counter in the embedded IC within each RGB LED. In certain example implementations, the electronic controller (as described above) may be in communication with the embedded ICs associated with each RGB LED, and may further provide a periodic reset signal to cause the embedded ICs to reset and restart the RGB LED illumination sequence after a predetermined period, such as between approximately one to several minutes.

The foregoing summarizes only a few aspects of the present disclosed technology and is not intended to be reflective of the full scope of the present disclosed technology. Additional features and advantages of the present disclosed technology are set forth in the following detailed description and drawings, may be apparent from the detailed description and drawings, or may be learned by practicing the present disclosed technology. Moreover, both the foregoing summary and following detailed description are exemplary and explanatory and are intended to provide further explanation of the presently disclosed technology as claimed.

BRIEF DESCRIPTION OF THE DRAWINGS

The accompanying drawings constitute a part of this specification and serve to illustrate certain implementations of the disclosed technology. The drawings are not intended to limit the scope of the presently disclosed subject matter in any manner.

DETAILED DESCRIPTION

Figure 1:
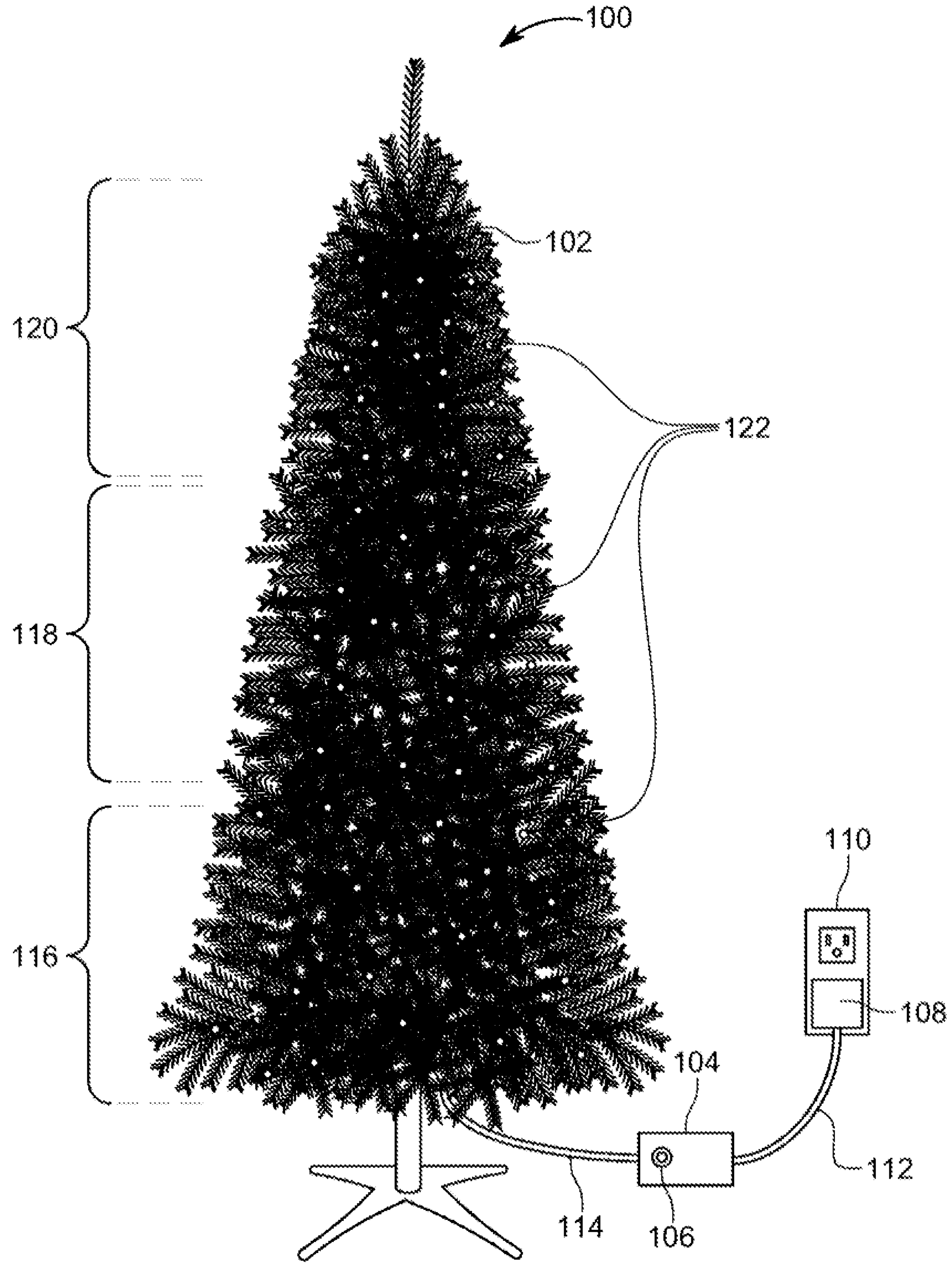
FIG. 1 depicts an assembled artificial Christmas tree having an installed decorative lighting system that includes one or more light strings containing light emitting diode (LED) lamps, in accordance with certain example implementations of the disclosed technology.

Although preferred embodiments of the disclosed technology are explained in detail, it is to be understood that other embodiments are contemplated. Accordingly, it is not intended that the disclosed technology is limited in its scope to the details of construction and arrangement of components set forth in the following description or illustrated in the drawings. The disclosed technology is capable of other embodiments and of being practiced or carried out in various ways. In describing the preferred embodiments, specific terminology will be resorted to for the sake of clarity.

It should be noted that, as used in the specification and the appended claims, the singular forms "a," "an" and "the" include plural references unless the context clearly dictates otherwise. References to a composition containing "a" constituent is intended to include other constituents in addition to the one named.

In describing the preferred embodiments, each term used contemplates its broadest meaning as understood by those skilled in the art and includes all technical equivalents, which operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered essential, they are identified as such.

It is also to be understood that the mention of one or more method steps does not preclude the presence of additional method steps or intervening method steps between those steps expressly identified. Moreover, although the term "step" may be used herein to connote different aspects of methods employed, the term should not be interpreted as implying any particular order among or between various steps herein disclosed unless and except when the order of individual steps is explicitly required.

The components described hereinafter as making up various elements of the disclosed technology are intended to be illustrative and not restrictive. Many suitable components that would perform the same or similar functions as the components described herein are intended to be embraced within the scope of the disclosed technology. Such other components not described herein can include, but are not limited to, for example, similar components that are developed after development of the presently disclosed subject matter.

To facilitate an understanding of the principles and features of the disclosed technology, various illustrative embodiments are explained below. In particular, the presently disclosed subject matter is described in the context of being an artificial tree lighting system. The present disclosed technology, however, is not so limited, and can be applicable in other contexts. For example, some embodiments of the present disclosed technology may improve other decorative lighting systems, such as light poles, lamps, extension cord systems, power cord connection systems, and the like. These embodiments are contemplated within the scope of the present disclosed technology. Accordingly, when the present disclosed technology is described in the context of a decorative lighting system for an artificial Christmas tree, it will be understood that other embodiments can take the place of those referred to herein.

Certain embodiments of the disclosed technology may include one or more decorative lighting systems. Certain example implementations of the decorative lighting systems may be integrated with an artificial tree. In other example implementations, the decorative lighting systems disclosed herein may be embodied as stand-alone lighting strings that may be used with any object or for illumination of an area at the discretion of the user.

FIG. 1 depicts an artificial Christmas tree assembly 100, according to an example implementation of the disclosed technology. Certain example implementations of the assembly 100 can include a tree 102 having installed thereon a decorative lighting system with one or more light strings that include a plurality of light emitting diode (LED) lamps. In one example implementation, the decorative lighting system may include one or more white LED light strings and one or more variable-color LED light strings. Certain example implementations may include just the variable-color LED light strings.

FIG. 1 depicts various LED light strings 122 distributed respectively in bottom, middle, and top segments 116, 118, 120 of the tree 102. In some embodiments, the LED light strings 122 distributed in a particular segment (e.g., 116) may be separately and independently controllable from the LED light strings 122 distributed in another segment (e.g., 118 or 120). The LED light strings 122 distributed to a particular segment may include all white LEDs, all RGB LEDs, or a combination of both. In other example implementations, each of the LED light strings 122 may overlap and/or be uniformly distributed over the tree, and not necessarily restricted to corresponding bottom, middle, and top segments 116, 118, 120 of the tree 102 as depicted. In certain example implementations, the LED light strings 122 may include various combinations of white LED bulbs and variable-color LED bulbs, but the LED light strings 122 may also be exclusively white or variable-color.

In accordance with an example implementation of the disclosed technology, the artificial Christmas tree assembly 100 may include a controller 104 in communication with the LED light strings 122. For example, a wiring harness 114 having two or more insulated conductors may connect the controller 104 to the LED lamp housings associated with LED light strings 122 to provide at least power and ground to the associated LEDs. The controller 104 may include a selector switch or button 106 for controlling the desired lighting mode. For example, a user may toggle the button 106 to select any combination of the (1) RGB LED illumination sequence; (2) the white LED illumination; and/or (3) both the RGB LED illumination sequence and the white LED illumination. As will be discussed with respect to FIG. 2 and FIG. 4 below, the controller 104 may also provide a control signal for resetting a "color show" sequence of the RGB LEDs in the decorative lighting system.

In accordance with an example implementation of the disclosed technology, the wiring harness 114 may provide various series/parallel wiring configurations for powering and controlling the individual LED lamps in the LED light strings 122. For example, the LEDs in each of the LED light strings 122 may individually be wired in series such that removal or opening of one of the LED circuits may interrupt power to a fraction or all of the other LEDs in that corresponding portion (for example, so that the user can be visually alerted to a missing or defective lamp assembly). In certain example implementations, the LED light strings 122 may be wired in parallel via the wiring harness 114 so that missing lamps (or other power/conductivity issues) associated with one portion does not interrupt power to the other portions. In this way, a power distribution problem in one of the LED light strings 122 may be isolated to one of the portions without causing the LEDs in the other portions to turn off.

As depicted in FIG. 1, a power cord 112 may connect power from a power outlet 110 to the controller 104. In certain example implementations, a power adapter 108 may be used between the power outlet 110 and the controller 104, for example, to transform and/or rectify alternating current power received from the power outlet 110 and to provide power to the controller 104. In certain example implementations, one or more of the functions associated with the power adapter 108 (such as transforming voltage, rectifying AC to DC, filtering ripple, switching power, or other functions) may be handled within the controller 104. For example, the power adapter 108 may include a transformer to transform 110 volt AC to a lower AC voltage (for example, approximately 10-15 volts AC). In an example implementation, the transformed AC power received from the power adapter 108 may be rectified within the controller 104. In yet other example implementations, the power adapter 108 may provide all of the transforming and rectifying and may provide an appropriate regulated DC voltage to the controller 104. Such schemes to modify and provide electrical power to circuits are well known to those having average skill in the art and will not be further discussed herein in the interest of brevity.

Figure 2:
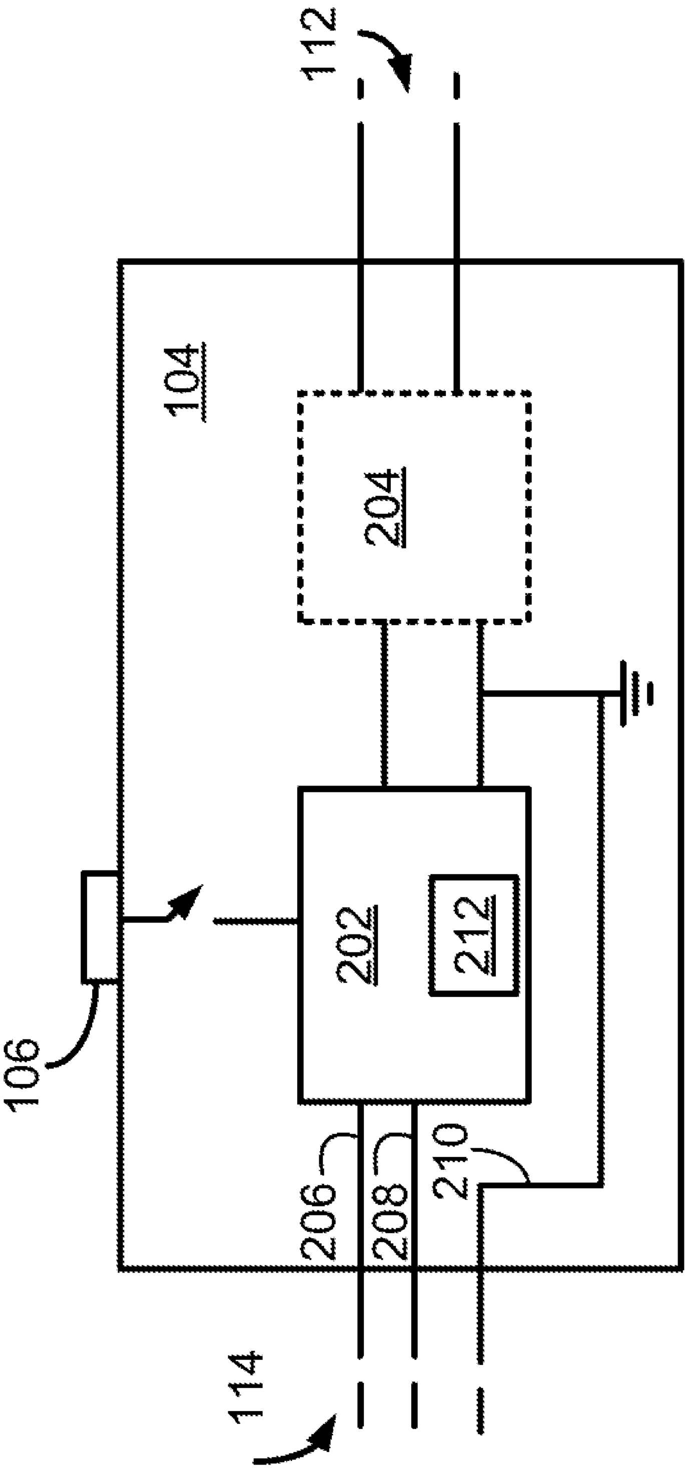
FIG. 2 is a block diagram of an example controller for use in a decorative lighting system, such as depicted in FIG. 1.

FIG. 2 is a block diagram of an example controller 104 for use in a decorative lighting system, such as depicted in the decorative lighting system 100 in FIG. 1. In accordance with an example implementation of the disclosed technology, power may be supplied by a power cord 112. As discussed above, the power cord 112 may provide alternating current that may need to be further rectified (e.g., by an optional power rectification/filtering circuit 204). In another example implementation, the power cord 112 may provide the proper direct current for operation of a control processor 202. In certain example implementations, the control processor 202 may be in communication with a user controllable switch or button 106 that may be pressed to select a particular mode of operation. For example, the controller 104 may allow a user to select (by pressing the button 106), any combination of the (1) RGB LED illumination sequence; (2) the white LED illumination; and/or (3) both the RGB LED illumination sequence and the white LED illumination.

In accordance with an example implementation of the disclosed technology, the output of the control processor 202 associated with the controller 104 may be in communication with the wiring harness 114 for distribution of energizing power and/or control signals to the various LEDs (and/or other lamps or accessories) associated with the decorative lighting system. In one example implementation, the output of the control processor 202 may include a common or ground return 210 and one or more energizing and/or control signal outputs 206, 208. In an example implementation where the decorative lighting system includes both white LED light strings and variable-color LED light strings, it may be desirable to independently energize or turn off the respective light strings. Thus, according to an example implementation, a first signal energizing and/or control signal output 206 may be used to independently turn on, turn off, and provide a light show reset signal for the variable-color LED light strings, while a second signal energizing and/or control signal output 208 may be used to independently turn on and turn off the white LED light strings, for example, based on the mode selected via the button 106.

In accordance with an example implementation of the disclosed technology, the control processor 202 may include a timing/reset circuit 212. In certain example implementations, and as will be discussed in detail below, the timing/reset circuit 212 may be configured to provide a periodic reset signal to the LED (and in particular, to embedded ICs within the RGB LED lamps) via one or more of the control signal outputs 206, 208.

Figure 3:
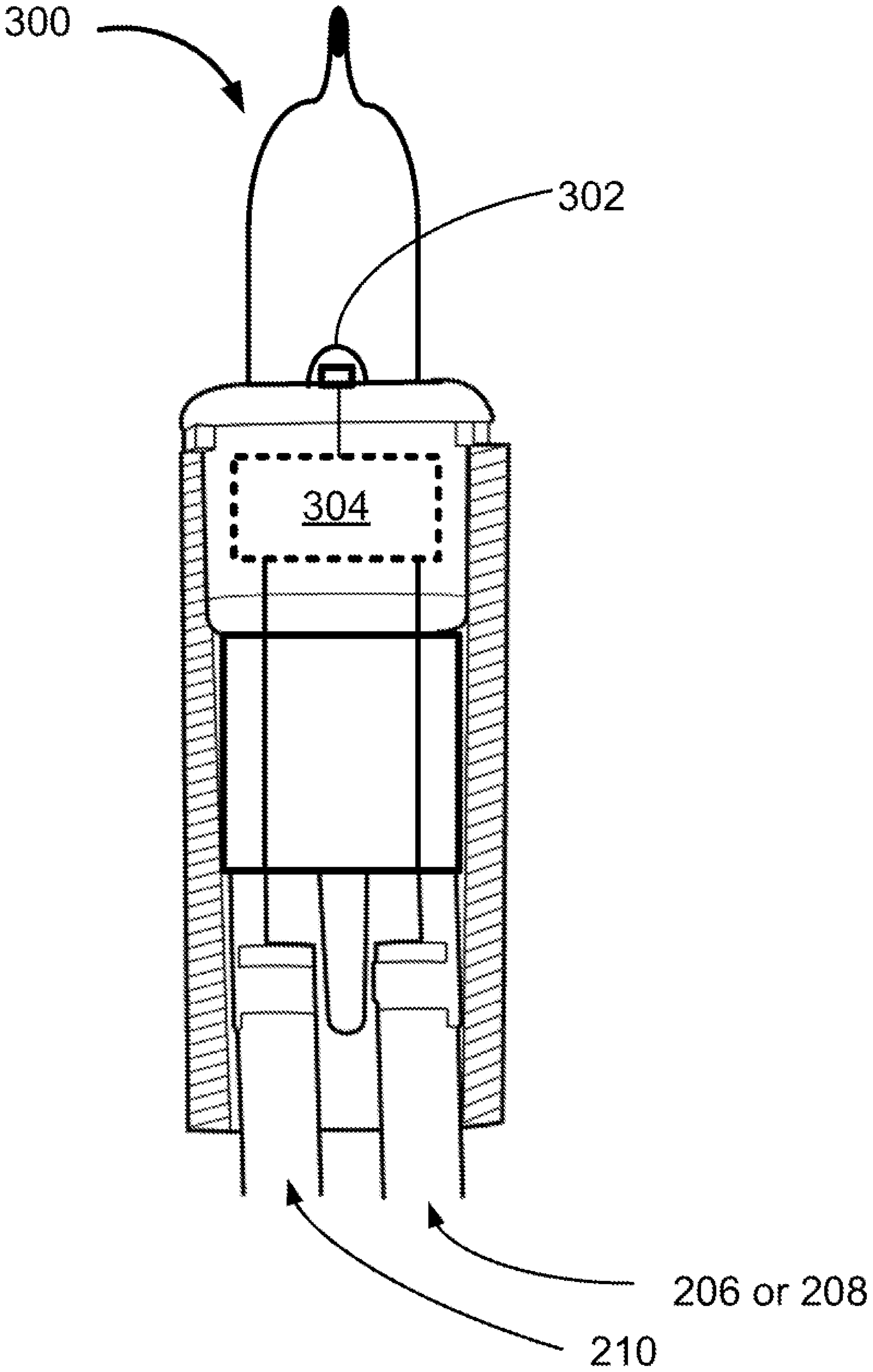
FIG. 3. depicts a white LED lamp for use in a decorative lighting system, such as depicted in FIG. 1.

FIG. 3. depicts a white LED lamp (or bulb) 300 for use in a decorative lighting system, such as depicted in FIG. 1. According to an example implementation, the white LED light strings of the decorative lighting system may employ such LED lamps 300 having an embedded LED 302. Other LED lamps for use in the disclosed decorative lighting system, such as LED lamps having more or less LEDs, or other options, are to be considered included in this disclosure, and the discussed white LED lamps are not intended to limit the scope of the disclosed technology to these specific number of LED elements within the lamps.

In an example implementation, the white LED lamps 300 can include embedded integrated circuit (IC) 304 inside each LED lamp 300. The embedded IC 304 can be configured to turn on and off the LED based on the mode selected via the button 106. In certain example implementations, the intensity or brightness of each LED can be individually controlled by the IC 304. In certain example implementations, the brightness of the LED may be controlled by pulse-width-modulation (PWM) output from the embedded IC 304.

Figure 4:
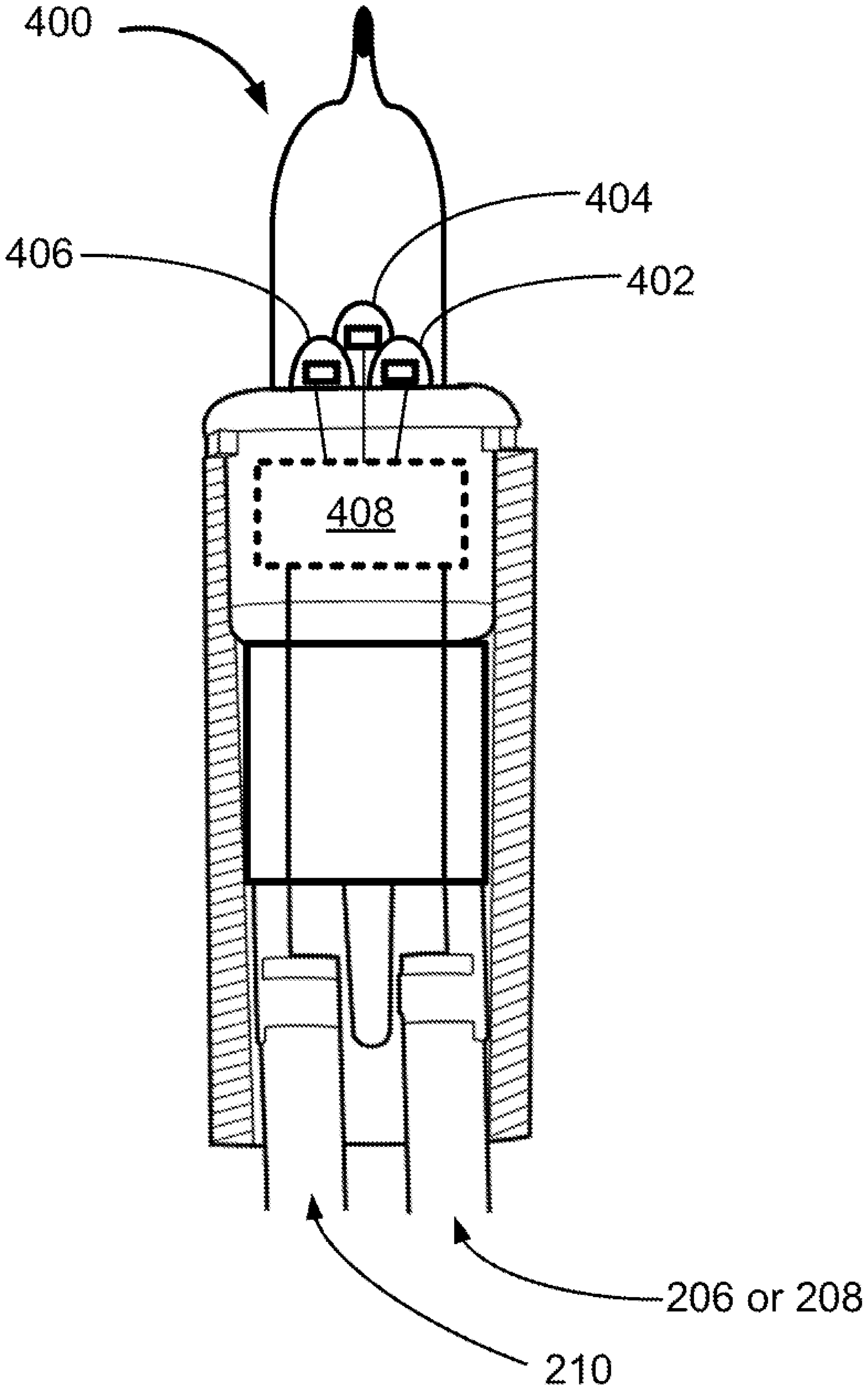
FIG. 4 depicts a multi-color (variable-color) LED lamp for use in a decorative lighting system, such as depicted in FIG. 1.

FIG. 4 depicts a multi-color LED lamp (or bulb) 400 for use in a decorative lighting system, such as depicted in FIG. 1. According to an example implementation, the variable-color LED light strings of the decorative lighting system may employ such LED lamps 400 having a plurality of embedded LEDs 402, 404, 406. In one example implementation, the plurality of embedded LEDs can include Red 402, Green 404, and Blue 406 (RGB) LEDs. Other LED lamps for use in the disclosed decorative lighting system, such as having different colors, more or less colors, or other options, are to be considered included in this disclosure, and the discussed RGB LED lamps are not intended to limit the scope of the disclosed technology to these specific colors or number of LED elements within the lamps.

In an example implementation, the (color) RGB LED bulbs 400 include an embedded integrated circuit (IC) 408 inside each LED lamp 400. The embedded IC 408 can be configured to communicate with and individually control the energizing of each of the corresponding RGB LEDs to create a multitude of different colors and color combinations. In certain example implementations, the embedded IC 408 can be configured to run a pre-programmed sequence for independently energizing the associated LEDs within the lamp 400 to produce the different colors without requiring any additional connections to the lamp socket besides power and ground (for example, as provided via the wiring harness 114).

According to an example implementation of the disclosed technology, once the variable-color LED light string is powered, the embedded ICs 408 within each RGB LED lamp 400 may be configured to initiate and control a sequence of illuminating colors that can vary with time. In certain example implementations, the intensity or brightness of each RGB LED 402, 404, 406 can be individually controlled by the IC 408. In certain example implementations, the brightness of the LEDs may be controlled by PWM output from the embedded IC 408. In other example implementations, the color of the lamp 400 may be determined by varying the PWM output from the embedded IC 408 to each RGB LED 402, 404, 406.

Figure 5:
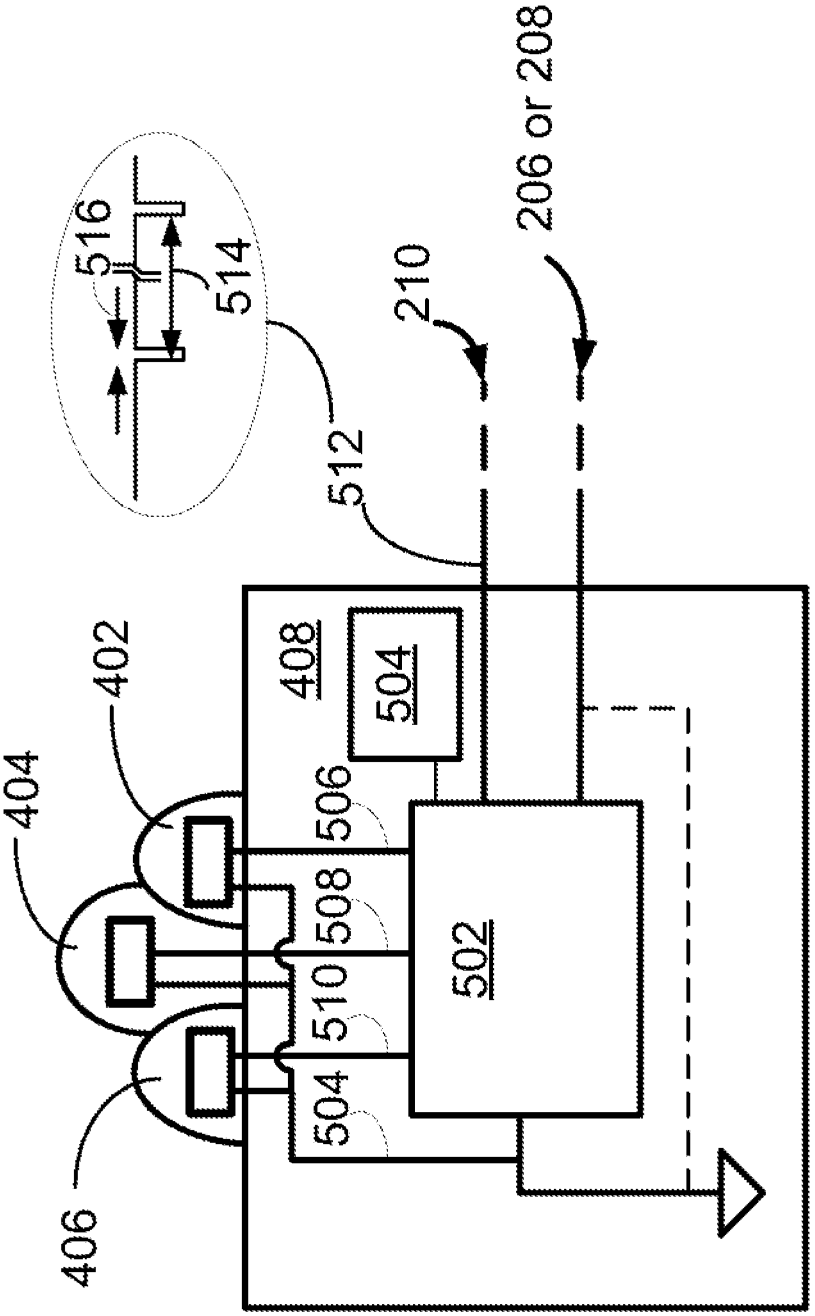
FIG. 5 is a block diagram depiction of the multi-color LED lamp, such as depicted in FIG. 3, having a built-in processor or embedded integrated circuit (IC) and may be configured for communication with the controller as depicted in FIG. 2.

FIG. 5 is a block diagram depiction of a multi-color LED lamp, such as depicted in FIG. 4, having a built-in or embedded IC 408 and configured for communication with a controller (such as the controller 104 as depicted in FIG. 2). In certain example implementations, the IC 408 may include a processor 502 and a memory 504 in communication with the processor 502. The memory 504, for example, may store non-volatile data, such as light show programming information, timing, or other information for controlling the illumination of the associated LEDs 402, 404, 406. In accordance with an example implementation of the disclosed technology, the processor 502 may include (or be in communication with) an output driver section (not shown) for providing drive current to the LEDs 402, 404, 406 via respective circuit paths 504, 506, 508, 510. In one example implementation, a common return path 504 may be provided. In certain example implementations, the return path 504 may be connected to the ground connection of the wiring harness 114, either directly, or indirectly.

In accordance with an example implementation of the disclosed technology, and as shown in the upper right hand portion of FIG. 5, a power/signal conductor 512 associated with the wiring harness 114 may provide selectable power and a control/reset signal to the embedded IC 408. In one example implementation, the power may be interrupted periodically 514 (such as every few minutes) for a short duration 516 (such as several milliseconds) to essentially reset the sequencing program running on the processor 502 so that it periodically 514 starts the light show sequence over. This feature of periodically providing a reset to the processor 502 of the embedded IC 408 in each RGB LED lamp may provide certain benefits such as, for example, enabling certain cost savings associated with the production and use of certain RGB LED lamps, as will be further explained below.

According to certain example implementations of the disclosed technology, the timing associated with the RGB LED illumination sequence may be controlled by a counter in the processor 502 of the embedded IC 408 within each RGB LED. In certain example implementations, the electronic controller (such as the controller 104 as shown in FIG. 1 and FIG. 2) may be in communication with the embedded IC 408 associated with each RGB LED to provide the periodic 514 reset 516 signal to cause the embedded ICs to reset and restart the RGB LED illumination sequence after a predetermined period, as discussed above.

In certain example implementations, the operating frequency of the counter in the embedded IC 408 may vary as a function of a number of factors including, but not limited to, temperature, circuit capacitance, resistance, manufacturing variables, or other factors. Due to certain size and cost parameters, it may not be feasible or desired to add a crystal oscillator to the circuit to improve the stability of the counter frequency (or uniformity of the frequency from unit to unit). Thus, in certain instances, when several of the RGB LEDs are energized at the same time, thereby initiating the same programmed light show sequence on each unit, the light show sequence from unit to unit may gradually lose synchronization due to the differences in the individual counter/clock frequencies that control the sequences on the individual RGB LEDs. Thus, according to an example implementation, the periodic reset from the controller 104 is provided to re-synchronize the light show at predetermined intervals. In one example implementation, upon power-up or reset, the RGB LED may start the sequence by illuminating Red lights and then migrate to Blue and then Green, at which time the controller 104 may provide a reset to start the sequence over after a predetermined period 514.

Figure 6:
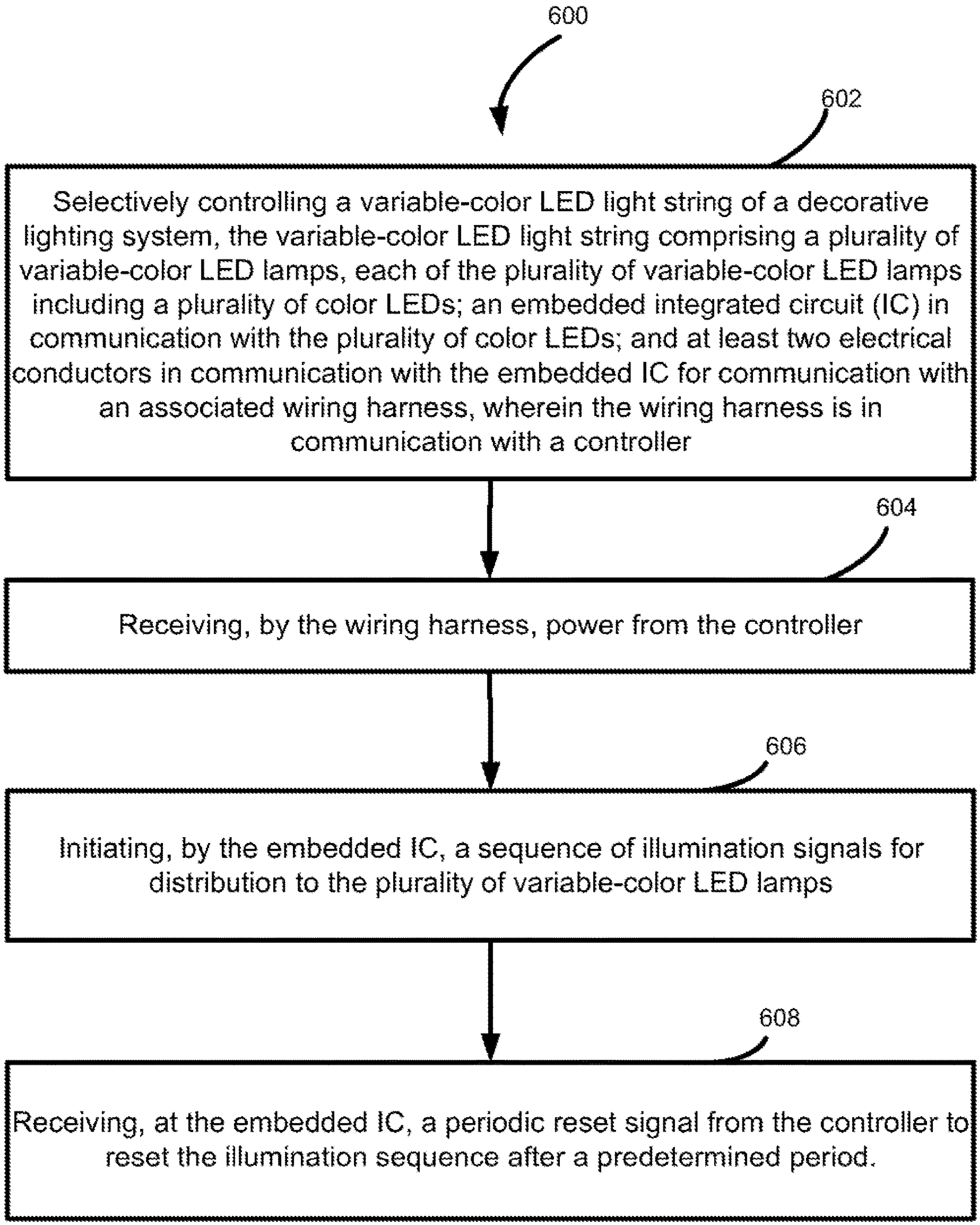
FIG. 6 is a method flow diagram, according to an example implementation of the disclosed technology.

FIG. 6 is a flow diagram of a method 600, according to an example implementation of the disclosed technology. The method 600 includes selectively controlling 602 a variable-color LED light string of a decorative lighting system, the variable-color LED light string comprising a plurality of variable-color LED lamps, each of the plurality of variable-color LED lamps a plurality of color LEDs; an embedded IC in communication with the plurality of color LEDs; at least two electrical conductors in communication with the embedded IC for communication with an associated wiring harness, wherein the wiring harness is in communication with a controller. The method 600 can further include selectively controlling 604 the variable-color LED light string by receiving, by the wiring harness, power from the controller. Additionally, the method 600 can include selectively controlling 606 the variable-color LED light string by initiating, by the embedded IC, a sequence of illumination signals for distribution to the plurality of variable-color LED lamps. Finally, the method 600 can include selectively controlling 608 the variable-color LED light string by receiving, at the embedded IC, a periodic reset signal from the controller to reset the illumination sequence after a predetermined period.

While the present disclosure has been described in connection with a plurality of exemplary aspects, as illustrated in the various figures and discussed above, it is understood that other similar aspects can be used or modifications and additions can be made to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

What is claimed is:

1. A lighted artificial tree comprising:

a power cord;

a wiring harness having two or more electrical conductors;

a first tree segment having a first decorative lighting system, the first decorative lighting system comprising:

a first light string, the first light string comprising a first plurality of lamps, each of the first plurality of lamps comprising a plurality of color LEDs; and a first controller configured to selectively control one or more illumination characteristics of the first plurality of lamps responsive to data indicative of user preference; and a second tree segment having a second decorative lighting system, the second decorative lighting system comprising:

a second light string, the second light string comprising a second plurality of lamps, each of the second plurality of lamps comprising a plurality of color LEDs; and a second controller configured to selectively control one or more illumination characteristics of the second plurality of lamps responsive to data indicative of user preference.

2. The lighted artificial tree of claim 1, wherein the lighted artificial tree further comprises a third tree segment having a third decorative lighting system, the third decorative lighting system comprising:

a third light string, the third light string comprising a third plurality of lamps, each of the third plurality of lamps comprising a plurality of color LEDs; and a third controller configured to selectively control one or more illumination characteristics of the third plurality of lamps responsive to data indicative of user preference.

3. The lighted artificial tree of claim 1, wherein at least one of the illumination characteristics of the plurality of color LEDs of the first decorative lighting system is controlled by Pulse-Width Modulation (PWM) signals.

4. The lighted artificial tree of claim 1, wherein the plurality of color LEDs of the first decorative light system comprises a red, a green, and a blue LED.

5. The lighted artificial tree of claim 1, wherein the respective controllers are configured to receive a signal for resetting a color show sequence of the color LEDs in the respective decorative lighting systems.

6. The lighted artificial tree of claim 1, wherein the respective controllers are configured to receive indications representative of user selections for displaying one or more illumination sequence.

7. The lighted artificial tree of claim 6, wherein a user can select from at least the following illumination sequences: (1) variable-color LED illumination sequence; (2) white LED illumination sequence; and/or (3) both the white LED illumination sequence and the variable-color LED illumination sequence.

8. A lighted artificial tree comprising:

a power cord;

a controller configured to (i) receive user input related to a desired illumination property and (ii) transmit instructions for selectively controlling one or more LED lamps based on the received desired illumination property;

a first trunk portion comprising:

a first trunk body;

a first wiring harness having two or more electrical conductors configured to be disposed at least partially within the first trunk body;

a first connection mechanism;

a first plurality of branch segments extending axially from the first trunk portion; and a first variable-color LED light string distributed across the first plurality of branch segments, the first variable-color LED light string comprising a first plurality of LED lamps, each of the first plurality of LED lamps comprising a plurality of LEDs; and a first integrated circuit (IC) configured to communicate with the first wiring harness and at least one of the first plurality of LED lamps; and a second trunk portion comprising:

second trunk body;

a second wiring harness having two or more electrical conductors configured to be disposed at least partially within the second trunk body;

a second connection mechanism;

a second plurality of branch segments extending axially from the first trunk portion; and a second variable-color LED light string distributed across the second plurality of branch segments, the second variable-color LED light string comprising a second plurality of LED lamps, each of the second plurality of LED lamps comprising a plurality of LEDs; and a second IC configured to communicate with the second wiring harness and at least one of the second plurality of LED lamps, wherein the first connection mechanism is configured to mate with the second connection mechanism when the first trunk portion is mated with the second trunk portion.

9. The lighted artificial tree of claim 8, wherein the plurality of LEDs of the first variable-color LED light string comprises a red, a green, and a blue LED.

10. The lighted artificial tree of claim 9, further comprising a white LED light string comprising at least one white LED lamp.

11. The lighted artificial tree of claim 8, wherein a color of an LED lamp of the first variable-color LED light string is determined by varying a pulse width modulation output from the first IC to at least one LED of at least one respective LED lamp of the first variable-color LED light string.

12. The lighted artificial tree of claim 8, wherein the desired illumination property can include one or more of LED brightness level, illumination sequence, blinking speed, and lamp color.

13. A lighted artificial tree comprising:

a power cord;

a wiring harness having two or more electrical conductors;

a first tree segment having a first decorative lighting system, the first decorative lighting system comprising:

a first light string, the first light string comprising a first plurality of lamps, at least one of the first plurality of lamps comprising a plurality of color LEDs; and a first controller configured to selectively control one or more illumination characteristics of at least one of the first plurality of lamps responsive to data indicative of user preference; and a second tree segment having a second decorative lighting system, the second decorative lighting system comprising:

a second light string, the second light string comprising a second plurality of lamps, at least one of the second plurality of lamps comprising a plurality of color LEDs; and a second controller configured to selectively control one or more illumination characteristics of at least one of the second plurality of lamps responsive to data indicative of user preference.

14. The lighted artificial tree of claim 13, wherein the lighted artificial tree further comprises a third tree segment having a third decorative lighting system, the third decorative lighting system comprising:

a third light string, the third light string comprising a third plurality of lamps, at least one of the third plurality of lamps comprising a plurality of color LEDs; and a third controller configured to selectively control one or more illumination characteristics of at least one of the third plurality of lamps responsive to data indicative of user preference.

15. The lighted artificial tree of claim 13, wherein at least one of the illumination characteristics of at least one of the plurality of color LEDs of the first decorative lighting system is controlled by Pulse-Width Modulation (PWM) signals.

16. The lighted artificial tree of claim 13, wherein at least one of the plurality of color LEDs of the first decorative light system comprises a red, a green, and a blue LED.

17. The lighted artificial tree of claim 13, wherein the respective controllers are configured to receive a signal for resetting a color show sequence of the color LEDs in the respective decorative lighting systems.

18. The lighted artificial tree of claim 13, wherein the respective controllers are configured to receive indications representative of user selections for displaying one or more illumination sequence.

* * * * *